United States Patent
Lin

(10) Patent No.: US 10,547,620 B2
(45) Date of Patent: Jan. 28, 2020

(54) METHOD AND DEVICE FOR MPLS INTERMEDIATE NODE TO PERFORM MULTICAST FORWARDING, AND NODE THEREOF

(71) Applicant: ZTE Corporation, Shenzhen (CN)

(72) Inventor: Ning Lin, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 268 days.

(21) Appl. No.: 15/539,251

(22) PCT Filed: Nov. 30, 2015

(86) PCT No.: PCT/CN2015/095995
§ 371 (c)(1),
(2) Date: Jun. 23, 2017

(87) PCT Pub. No.: WO2016/101770
PCT Pub. Date: Jun. 30, 2016

(65) Prior Publication Data
US 2018/0332045 A1  Nov. 15, 2018

(30) Foreign Application Priority Data

Dec. 25, 2014  (CN) .......................... 2014 1 0820870

(51) Int. Cl.
*H04L 29/06* (2006.01)
*H04L 12/18* (2006.01)
(Continued)

(52) U.S. Cl.
CPC ........ *H04L 63/101* (2013.01); *H04L 12/1886* (2013.01); *H04L 45/16* (2013.01);
(Continued)

(58) Field of Classification Search
None
See application file for complete search history.

(56) References Cited

U.S. PATENT DOCUMENTS 8,929,254 B2*  1/2015  Hu ...................... H04L 12/4641
                                            370/256
2005/0027782 A1*  2/2005  Jalan .................. H04L 12/1886
                                            709/200
(Continued)

FOREIGN PATENT DOCUMENTS

| CN | 101626338 A | 1/2010 |
|----|-------------|--------|
| CN | 102035729 A | 4/2011 |
| CN | 102075439 A | 5/2011 |

OTHER PUBLICATIONS

International Search Report for corresponding application PCT/CN2015/095995 filed on Nov. 30, 2015; dated Mar. 4, 2016.
(Continued)

*Primary Examiner* — Jeffrey R Swearingen
(74) *Attorney, Agent, or Firm* — Cantor Colburn LLP

(57) ABSTRACT

Provided is a method for a Multiple Protocol Label Switching (MPLS) intermediate node to perform multicast forwarding, which includes that: a Provider (P) node captures an MPLS packet according an Access Control List (ACL) rule, redirects the captured MPLS packet to a Virtual Private LAN Service (VPLS) multicast forwarding table, and multicasts and forwards the MPLS packet according to next hop information of each multicast forwarding table entry in the VPLS multicast forwarding table. A device for an MPLS intermediate node to perform multicast forwarding, and a node are also provided.

13 Claims, 2 Drawing Sheets

(51) Int. Cl.
*H04L 12/723* (2013.01)
*H04L 12/761* (2013.01)
*H04L 12/46* (2006.01)
*H04L 12/713* (2013.01)

(52) U.S. Cl.
CPC ........ *H04L 45/502* (2013.01); *H04L 63/0263* (2013.01); *H04L 12/4641* (2013.01); *H04L 45/586* (2013.01)

(56) References Cited

U.S. PATENT DOCUMENTS

| | | |
|---|---|---|
| 2007/0133529 A1 | 6/2007 | Lee |
| 2008/0222290 A1 | 9/2008 | Le Moigne |
| 2010/0040060 A1* | 2/2010 | Gleeson .................. H04L 45/00 370/392 |
| 2013/0058351 A1 | 3/2013 | Casado |

OTHER PUBLICATIONS

European Search Report for corresponding application EP15871839; Reported dated Dec. 13, 2017.

* cited by examiner

METHOD AND DEVICE FOR MPLS INTERMEDIATE NODE TO PERFORM MULTICAST FORWARDING, AND NODE THEREOF

TECHNICAL FIELD

The present disclosure relates to a packet forwarding technology, in particular to a method and device for a Multiprotocol Label Switching (MPLS) intermediate node to perform multicast forwarding, and a node.

BACKGROUND

Generally, when MPLS forwarding is performed on a Provider (P) node in a service provider network, the P node will directly search an MPLS forwarding table according to an ingress tunnel label of an MPLS packet, and then directly sends the table replacing the tunnel label. Such forwarding is one-to-one, and the one-to-many forwarding is impossible.

The present MPLS multicasting is performed on an ingress service Provider Edge (PE) node in a Layer 2 Virtual Private Network (L2VPN) multicasting mode of an MPLS ingress; after an original packet enters the PE node, the PE node directly encapsulates a tunnel label and a pseudo-wire label and sends them from a corresponding multicast egress by means of the network deployment of a Virtual Private LAN Service (VPLS).

The currently common forwarding on the P node includes steps as follows:
1. after an MPLS packet is received, an MPLS table is searched through a tunnel label of the MPLS packet;
2. a corresponding MPLS table entry is found; the tunnel label of an egress is included in the table, a label action is label switching, and the egress position is pointed out; and
3. the tunnel label of the packet is directly replaced with the tunnel label of the egress in the MPLS table, and is sent out from the egress, so as to complete the label switching forwarding at the P node.

The currently common multicasting on the VPLS PE node includes steps as follows:
1. A user side packet enters the PE node;
2. The PE node searches a Media Access Control (MAC) address table according to an MAC address of the user side packet, and determines a VPLS multicast group; and
3. According to the setting of a multicast grout table entry, a pseudo-wire label and a tunnel label are added for the user side packet and sent from each port group corresponding to the multicast group.

It can be seen from above that in related art, there is no such a technology for performing point-to-multipoint multicast forwarding aiming at the P node, because it is unable to perform point-to-multipoint forwarding on the P node, 1+1 or 1+N protection cannot be realized on the P node.

SUMMARY the embodiments of the present disclosure provide a method and device for an MPLS intermediate node to perform multicast forwarding, and a node.

The technical solutions of the present disclosure are implemented as follows.

According to an embodiment of the present disclosure, a method for an MPLS intermediate node to perform multicast forwarding is provided, and the method includes that: a P node in a service provider network captures an MPLS packet according to an Access Control List (ACL) rule, redirects the captured MPLS packet to a VPLS multicast forwarding table, and multicasts and forwards the MPLS packet according to next hop information of each multicast forwarding table entry in the VPLS multicast forwarding table.

In some embodiments, the method further includes that: before the P node captures the MPLS packet according to the ACL rule, an ingress tunnel label, an ingress port and an Ethernet type of the MPLS packet needing multicasting are configured as an ACL rule, and the P node stores the ACL rule; an egress label of next hop information of each egress needing multicast forwarding is set as the label of an egress tunnel, a label action is set as label switching, and a label port is set as an egress port; all the next hop information needing multicast forwarding is added in the VPLS multicast forwarding table to form at least one multicast forwarding table entry, after that, the action of the ACL rule is configured as redirecting to the VPLS multicast forwarding table.

In some embodiments, that the P node captures the MPLS packet according to the ACL rule includes that: in a static MPLS scenario, after the P node receives the MPLS packet, when it is determined that an ingress tunnel label of the MPLS packet matches with the tunnel label configured in the ACL rule, the P node captures the MPLS packet; in a dynamic MPLS scenario, after the P node receives the MPLS packet, when it is determined that the ingress port and the Ethernet type of the MPLS packet match with that in the ACL rule, the P node captures the MPLS packet.

In some embodiments, that the P node redirects the captured MPLS packet to the VPLS multicast forwarding table includes that: the P node redirects the captured MPLS packet to the VPLS multicast forwarding table according to that the action configured in the ACL rule is redirecting to the VPLS multicast forwarding table.

In some embodiments, that the P node multicasts and forwards the MPLS packet according to the next hop information of each multicast forwarding table entry in the VPLS multicast forwarding table includes that:
the P node searches a forwarding action of the VPLS multicast forwarding table, and if the search result is that forwarding the MPLS packet to at least one next hop is needed, multicasts and forwards the MPLS packet to at least one next hop according to that the egress label is the label of the egress tunnel, the label action is label switching, and the label port is the egress port in each multicast forwarding table entry.

According to an embodiment of the present disclosure, a device for an MPLS intermediate node to perform multicast forwarding is provided by the, and the device includes: a packet capturing module, a redirecting module, and a multicasting module.

The packet capturing module is configured to capture the MPLS packet according to the ACL rule.

The redirecting module is configured to redirect the captured MPLS packet to the VPLS multicast forwarding table.

The multicasting module is configured to multicast forward the MPLS packet according to the next hop information of each multicast forwarding table entry in the VPLS multicast forwarding table.

In some embodiments, the device further includes: a configuring module, which is configured to store the ACL rule, wherein the ACL rule takes an ingress tunnel label, an ingress port and an Ethernet type of the MPLS packet needing multicasting as a matching rule, and configure the action of the ACL rule as redirecting to the VPLS multicast forwarding table; the configuring module is further configured to store the VPLS multicast forwarding table, wherein the VPLS multicast forwarding table includes at least one multicast forwarding table entry, and each multicast forwarding table entry correspondingly stores the next hop information of each egress needing multicast forwarding; the next hop information includes that: the egress label is the label of the egress tunnel, the label action is label switching, and the label port is the egress port.

In some embodiments, the packet capturing module is further configured to, in the static MPLS scenario, when it is determined that that the ingress tunnel label of the MPLS packet matches with the tunnel label configured in the ACL rule, capture the MPLS packet; the packet capturing module is further configured to, in the dynamic MPLS scenario, when it is determined that the ingress port and the Ethernet type of the MPLS packet match with that in the ACL rule, capture the MPLS packet.

In some embodiments, the redirecting module is further configured to redirect the captured MPLS packet to the VPLS multicast forwarding table according to that the action configured in the ACL rule is redirecting to the VPLS multicast forwarding table.

In some embodiments, the multicasting module is further configured to search the forwarding action of the VPLS multicast forwarding table, and if it is searched that the forwarding action is needing to forward to at least one next hop, multicast and forward the MPLS packet to at least one next hop according to that the egress label is the label of the egress tunnel, the label action is label switching, and the label port is the egress port in each multicast forwarding table entry.

According to an embodiment of the present disclosure, a node is also provided, and the node includes the device.

According to the method and device for an MPLS intermediate node to perform multicast forwarding, and the node provided by the embodiments of the present disclosure, the P node captures the MPLS packet according to the ACL rule, redirects the captured MPLS packet to the VPLS multicast forwarding table, and multicasts and forwards the MPLS packet according to the next hop information of each multicast forwarding table entry in the VPLS multicast forwarding table; in such a manner, a multicast deployment can be placed on the P node, so that the configuration flexibility of networks is improved; moreover, because point-to-point or point-to-multipoint forwarding can be realized on the P node, 1+1 or 1+N line protection on the P node can also be realized.

DETAILED DESCRIPTION OF THE EMBODIMENTS

In the embodiment of the present disclosure, a P node captures an MPLS packet according to an ACL rule, redirects the captured MPLS packet to a VPLS multicast forwarding table, and multicasts and forwards the MPLS packet according to next hop information of each multicast forwarding table entry in the VPLS multicast forwarding table.

An elaboration is given below through the accompanying drawings and specific embodiments.

Figure 1:
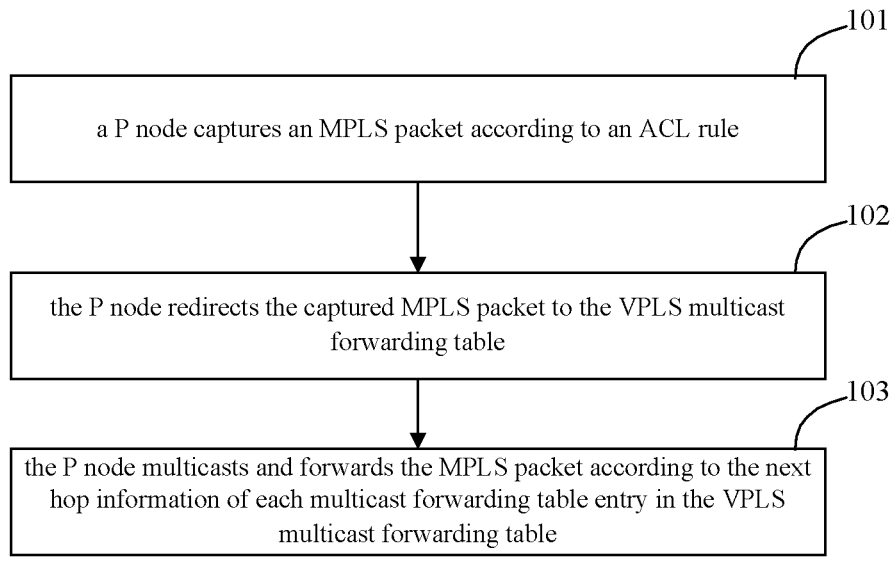
FIG. 1 is a flowchart of a method for an MPLS intermediate node to perform multicast forwarding provided in the embodiment of the present disclosure.

The embodiment of the present disclosure realizes a method for an MPLS intermediate node to perform multicast forwarding; as shown in FIG. 1, the method includes the following steps.

S101: a P node captures an MPLS packet according to an ACL rule;

further, in a static MPLS scenario, after receiving the MPLS packet, the P node judges whether an ingress tunnel label of the MPLS packet matches with the tunnel label configured in the ACL rule, and when it is determined that the ingress tunnel label of the MPLS packet matches with the tunnel label configured in the ACL rule, the P node captures the MPLS packet; in a dynamic MPLS scenario, because the ingress tunnel label is dynamically assigned, after receiving the MPLS packet, the P node judges whether an ingress port and an Ethernet type of the MPLS packet match with that configured in the ACL rule, and when it is determined that the ingress port and the Ethernet type of the MPLS packet match with that configured in the ACL rule, the P node captures the MPLS packet.

S102: the P node redirects the captured MPLS packet to the VPLS multicast forwarding table;

The P node redirects the captured MPLS packet to the VPLS multicast forwarding table according to that the action configured in the ACL rule is redirecting to the VPLS multicast forwarding table.

Figure 2:
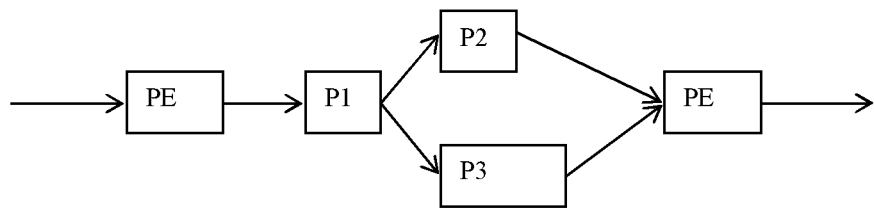
FIG. 2 is a schematic diagram of line protection on a P node provided in the embodiment of the present disclosure.

S103: the P node multicasts and forwards the MPLS packet according to the next hops information of each entry in the VPLS multicast forwarding table;

The P node searches a forwarding action of the VPLS multicast forwarding table, and if the search result is that forwarding the MPLS packet to at least one next hop is needed, multicasts and forwards the MPLS packet to at least one next hop according to that an egress label is the label of the egress tunnel, an label action is label switching, and an label port is an egress port in each multicast forwarding table entry; here, where there are two or more than two next hops, 1+1 or 1+N line protection can be set from the P node to the next hop; as shown in FIG. 2, the P1 node multicasts the MPLS packet to the P2 node and the P3 node, wherein the P3 node is the backup of the P2 node, so that 1+1 line protection from the P1 node to the P2 node is formed.

Before S101, the method further includes that: the ingress tunnel label, the ingress port and the Ethernet type of the MPLS packet needing multicasting are configured as an ACL rule, and the P node stores the ACL rule; an egress label of next hop information of each egress needing multicast forwarding is set as the label of an egress tunnel, the label action is set as label switching, and the label port is set as the egress port; all the next hop information needing multicast forwarding is added in the VPLS multicast forwarding table to form at least one multicast forwarding table entry, wherein the difference between the formed multicast forwarding table entry and the common VPLS multicast forwarding table entry is that its label action is label switching but not pushing the label to a stack; after that, the action of the ACL rule is configured as redirecting to the VPLS multicast forwarding table.

Figure 3:
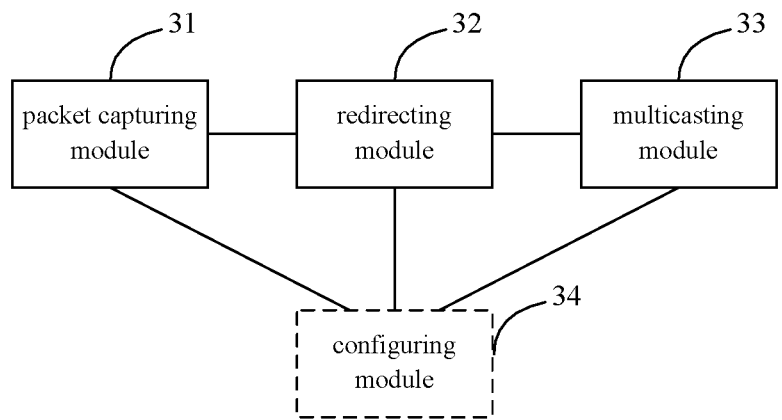
FIG. 3 is a structure diagram of a device for an MPLS intermediate node to perform multicast forwarding provided in the embodiment of the present disclosure.

The embodiment of the present disclosure also provides a device for an MPLS intermediate node to perform multicast forwarding, which is set on the P node; as shown in FIG. 3, the device includes: a packet capturing module 31, a redirecting module 32, and a multicasting module 33; wherein, the packet capturing module 31 can be realized by an incoming interface of the P node, and is configured to capture the MPLS packet according to the ACL rule;

the redirecting module 32 can be realized by a memory of the P node, and is configured to redirect the captured MPLS packet to the VPLS multicast forwarding table; and the multicasting module 33 can be realized by a processor in combination with the memory of the P node, and is configured to multicast and forward the MPLS packet according to the next hop information of each multicast forwarding table entry in the VPLS multicast forwarding table.

The device further includes: a configuring module 34, which is configured to store the ACL rule, wherein the ACL rule takes an ingress tunnel, an ingress port and an Ethernet type of the MPLS packet needing multicasting as a matching rule, and configure the action of the ACL rule as redirecting to the VPLS multicast forwarding table; the configuring module is further configured to store the VPLS multicast forwarding table, wherein the VPLS multicast forwarding table includes at least one multicast forwarding table entry, and each multicast forwarding table entry correspondingly stores the next hop information of each egress needing multicast forwarding; the next hop information includes that: the egress label is the label of the egress tunnel, the label action is label switching, and the label port is the egress port.

The packet capturing module 31 is further configured to, in the static MPLS scenario, when it is determined that that the ingress tunnel label of the MPLS packet matches with the tunnel label configured in the ACL rule, capture the MPLS packet; the packet capturing module is further configured to, in the dynamic MPLS scenario, when it is determined that the ingress port and the Ethernet type of the MPLS packet match with that in the ACL rule, capture the MPLS packet.

The redirecting module 32 is further configured to redirect the captured MPLS packet to the VPLS multicast forwarding table according to that the action configured in the ACL rule is redirecting to the VPLS multicast forwarding table.

The multicasting module 33 is further configured to search the forwarding action of the VPLS multicast forwarding table, and if it is searched that the forwarding action is needing to forward to at least one next hop, multicast and forward the MPLS packet to at least one next hop according to that the egress label is the label of the egress tunnel, the label action is label switching, and the label port is the egress port in each multicast forwarding table entry.

Based on the above device, the present disclosure also provides a node, which includes the device for performing multicast forwarding shown in FIG. 3.

The method of the present disclosure is elaborated below through a specific application scenario.

Figure 4:
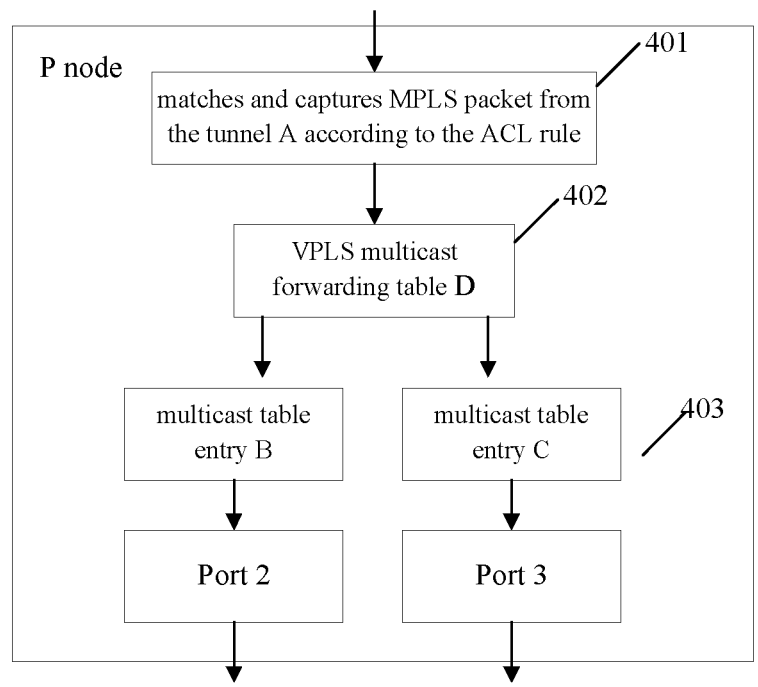
FIG. 4 is a schematic diagram that a P node performs multicast and forwarding provided in the embodiment of the present disclosure.

As shown in FIG. 4, the port No. 1 of the P node is connected to the tunnel A, and it is needed to multicast the packet to the tunnel B and the tunnel C; the egress of the tunnel B is the port No. 2, and the egress of the tunnel C is the port No. 3; the method includes the following steps.

S401: the P node captures the MPLS packet entering from the tunnel A connected to the port No. 1 according to the ACL rule;

here, the P node captures the MPLS packet according to that the MPLS packet matches with the ingress tunnel label, or the packet matches with the port No. 1 and the Ethernet type.

S402: the P node redirects the captured MPLS packet to the VPLS multicast forwarding table D according to the action configured in the ACL rule;

here, the tunnel label of the tunnel B and information about the port No. 2 are preset in the next hop B, and the tunnel label of the tunnel C and information about the port No. 3 are preset in the next hop C, the label action of the tunnel labels B and C is label switching, and the information about the next hop B and the next hop C is written in the VPLS multicast forwarding table, so as to establish the VPLS multicast forwarding table D.

S403: the P node searches the forwarding action of the multicast forwarding table D, and finds that the forwarding action is forwarding to two next hops B and C, and the action recorded in the next hop is label switching, then the P node replaces the tunnel label of the MPLS packet with the tunnel label B and sends it from the port No. 2, and replaces the tunnel label of the MPLS packet with the tunnel label C and sends it from the port No. 3.

If the modules of the present disclosure are implemented in the form of software function modules and sold or used as independent products, they can also be stored in a computer readable storage medium. Based on this understanding, those skilled in the art should appreciate that the embodiments of the application can be provided as a method, a system or a computer program product. So, this application can adopt the forms of full hardware embodiment, full software embodiment, or embodiment combining software and hardware. Besides, this application can adopt the form of a computer program product which is implemented on one or more computer available storage media including computer available program codes, wherein the storage media include, but are not limited to, a USB flash disk, a mobile hard disk drive, a Read-Only Memory (ROM), a magnetic disk memory, a Compact Disc-ROM (CD-ROM), an optical memory, and so on.

This application is described according to the flowcharts and/or block diagrams of the method, the device (system) and the computer program product in the embodiments of this application. It should be understood that each flow and/or block in the flowchart and/or block diagram, and the combination of the flow and/or block in the flowchart and/or block diagram can be implemented by the computer program instructions. These computer program instructions can be provided to the processing unit of the general-purpose computer, the special-purpose computer, the embedded processor or other programmable data processing equipment to generate a machine, so that instructions which are executed by the processing unit of the computer or other programmable data processing equipment generate the device which is used for implementing the specified functions in one or more flows of the flowchart and/or one or more blocks of the block diagram.

These computer program instructions can also be stored in the computer-readable memory which can guide the computer or other programmable data processing equipment to work in a particular way, so that the instructions stored in the computer-readable memory generate the product including the instruction device, wherein the instruction device implements the specified functions in one or more flows of the flowchart and/or one or more blocks of the block diagram.

These computer program instructions can also be loaded on the computer or other programmable data processing equipment, so that a series of operation steps are performed on the computer or other programmable data processing equipment to generate the processing implemented by the computer, and the instructions executed on the computer or other programmable data processing equipment provide the steps for implementing the specified functions in one or more flows of the flowchart and/or one or more blocks of the block diagram.

Correspondingly, the present disclosure also provides a computer storage medium, in which a computer program is stored; the computer program is used for performing the method for an MPLS intermediate node to perform multicast forwarding.

The above is only the preferred embodiments of the present disclosure and not intended to limit the scope of protection of the present disclosure; any modifications, equivalent replacements and improvements shall fall within the scope of protection of the present disclosure.

INDUSTRIAL APPLICABILITY

In the embodiments of the present disclosure, the P node captures the MPLS packet according to the ACL rule, redirects the captured MPLS packet to the VPLS multicast forwarding table, and multicasts and forwards the MPLS packet according to the next hop information of each multicast forwarding table entry in the VPLS multicast forwarding table; in such a manner, the multicast deployment can be placed on the P node, so that the configuration flexibility of networks is improved; moreover, because point-to-point or point-to-multipoint forwarding can be realized on the P node, 1+1 or 1+N line protection on the P node can also be realized.

What is claimed is:

1. A method for a Multiple Protocol Label Switching (MPLS) intermediate node to perform multicast forwarding, comprising:
    capturing, by a Provider (P) node in a service provider network, an MPLS packet according to an Access Control List (ACL) rule;
    redirecting the captured MPLS packet to a Virtual Private LAN Service (VPLS) multicast forwarding table; and
    multicast forwarding the MPLS packet according to next hop information of each multicast forwarding table entry in the VPLS multicast forwarding table;
    before capturing, by the P node, the MPLS packet according to the ACL rule, further comprising:
    configuring an ingress tunnel label, an ingress port and an Ethernet type of the MPLS packet needing multicasting as an ACL rule;
    storing, by the P node, the ACL rule;
    setting an egress label of next hop information of each egress needing multicast forwarding as the label of an egress tunnel, setting a label action as label switching, and setting a label port as an egress port;
    adding all the next hop information needing multicast forwarding in the VPLS multicast forwarding table to form at least one multicast forwarding table entry; and
    configuring the action of the ACL rule as redirecting to the VPLS multicast forwarding table.

2. The method as claimed in claim 1, wherein capturing, by the P node, the MPLS packet according to the ACL rule comprises:
    in a static MPLS scenario, after the P node receives the MPLS packet, when it is determined that an ingress tunnel label of the MPLS packet matches with the tunnel label configured in the ACL rule, capturing, by the P node, the MPLS packet; in a dynamic MPLS scenario, after the P node receives the MPLS packet, when it is determined that the ingress port and the Ethernet type of the MPLS packet match with the ingress port and the Ethernet type configured in the ACL rule, capturing, by the P node, the MPLS packet.

3. The method as claimed in claim 1, wherein redirecting the captured MPLS packet to the VPLS multicast forwarding table comprises: redirecting, by the P node, the captured MPLS packet to the VPLS multicast forwarding table when the action configured in the ACL rule is redirecting to the VPLS multicast forwarding table.

4. The method as claimed in claim 1, wherein multicast forwarding the MPLS packet according to the next hop information of each multicast forwarding table entry in the VPLS multicast forwarding table comprises:
    searching, by the P node, a forwarding action of the VPLS multicast forwarding table, and if a search result is that forwarding the MPLS packet to at least one next hop is needed, multicast forwarding the MPLS packet to at least one next hop when the egress label is the label of the egress tunnel, the label action is label switching, and the label port is the egress port in each multicast forwarding table entry.

5. A device for a Multiple Protocol Label Switching (MPLS) intermediate node to perform multicast forwarding, comprising: a packet capturing module, a redirecting module, a multicasting module and a configuring module; wherein,
    the packet capturing module is configured to capture an MPLS packet according to an Access Control List (ACL) rule;
    the redirecting module is configured to redirect the captured MPLS packet to a Virtual Private LAN Service (VPLS) multicast forwarding table; and
    the multicasting module is configured to multicast and forward the MPLS packet according to next hop information of each multicast forwarding table entry in the VPLS multicast forwarding table;
    the configuring module is configured to store the ACL rule, wherein the ACL rule takes an ingress tunnel label, an ingress port and an Ethernet type of the MPLS packet needing multicasting as a matching rule, and configure the action of the ACL rule as redirecting to the VPLS multicast forwarding table; the configuring module is further configured to store the VPLS multicast forwarding table, wherein the VPLS multicast forwarding table comprises at least one multicast forwarding table entry, and each multicast forwarding table entry correspondingly stores the next hop information of each egress needing multicast forwarding; the next hop information comprises that: the egress label is the label of an egress tunnel, label action is label switching, and a label port is an egress port.

6. The device as claimed in claim 5, wherein the packet capturing module is further configured to, in a static MPLS scenario, when it is determined that that the ingress tunnel label of the MPLS packet matches with the tunnel label configured in the ACL rule, capture the MPLS packet; the packet capturing module is further configured to, in a dynamic MPLS scenario, when it is determined that the ingress port and the Ethernet type of the MPLS packet match with that in the ACL rule, capture the MPLS packet.

7. The device as claimed in claim 5, wherein the redirecting module is further configured to redirect the captured MPLS packet to the VPLS multicast forwarding table when the action configured in the ACL rule is redirecting to the VPLS multicast forwarding table.

8. The device as claimed in claim 5, wherein the multicasting module is further configured to search a forwarding action of the VPLS multicast forwarding table, and if it is searched that the forwarding action is needing to forward to at least one next hop, multicast and forward the MPLS packet to at least one next hop when the egress label is the label of the egress tunnel, the label action is label switching, and the label port is the egress port in each multicast forwarding table entry.

9. A node, comprising a device as claimed in claim 5.

10. A node, comprising a device as claimed in claim 6.

11. A node, comprising a device as claimed in claim 7.

12. A node, comprising a device as claimed in claim 8.

13. A non-volatile computer-readable storage medium, which stores a program instruction, the program instruction being executed to implement the method as claimed in claim 1.

\* \* \* \* \*